(12) United States Patent
Belnap et al.

(10) Patent No.: US 11,840,891 B2
(45) Date of Patent: Dec. 12, 2023

(54) CUTTING ELEMENTS WITH MODIFIED DIAMOND SURFACE

(71) Applicant: Schlumberger Technology Corporation, Sugar Land, TX (US)

(72) Inventors: John Daniel Belnap, Lindon, UT (US); Yahua Bao, Orem, UT (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 430 days.

(21) Appl. No.: 17/270,127

(22) PCT Filed: Aug. 21, 2019

(86) PCT No.: PCT/US2019/047447
§ 371 (c)(1),
(2) Date: Feb. 22, 2021

(87) PCT Pub. No.: WO2020/041432
PCT Pub. Date: Feb. 27, 2020

(65) Prior Publication Data
US 2021/0172257 A1      Jun. 10, 2021

Related U.S. Application Data

(60) Provisional application No. 62/722,209, filed on Aug. 24, 2018.

(51) Int. Cl.
*E21B 10/567* (2006.01)
*C04B 35/528* (2006.01)
(Continued)

(52) U.S. Cl.
CPC ........ *E21B 10/5673* (2013.01); *C04B 35/528* (2013.01); *C04B 35/645* (2013.01);
(Continued)

(58) Field of Classification Search
CPC ......... E21B 10/56–5735; C04B 41/009; C04B 41/5057; C04B 41/87; C04B 2235/427;
(Continued)

(56) References Cited

U.S. PATENT DOCUMENTS 6,220,375 B1    4/2001 Butcher et al.
2006/0157286 A1    7/2006 Pope
(Continued)

FOREIGN PATENT DOCUMENTS

CN    102648328 A    8/2012
CN    107923226 A    4/2018
(Continued)

OTHER PUBLICATIONS

First Office Action and Search Report issued in China Patent Application No. 2019800578633 dated Mar. 1, 2023, 13 pages.
(Continued)

*Primary Examiner* — Kristyn A Hall
(74) *Attorney, Agent, or Firm* — Jeffrey D. Frantz (57) ABSTRACT

Cutting elements include a carbonate diamond-bonded body that is sintered under HPHT conditions in the presence of a carbonate material, where the body includes a matrix phase of intercrystalline bonded diamond with interstitial regions including the carbonate material, where the diamond-bonded body is sintered without a substrate. A matrix casting is formed and mechanically coupled to the body after the body is sintered, and a portion of the body surface is exposed along a surface of the matrix casting. The exposed body surface is thereafter intentionally treated to induce a compressive residual surface stress that is greater than a remaining portion of the body. The compressive residual surface stress is less than about 500 MPa, and from about 100 to 500
(Continued)

MPa, and a remaining region the body may have a residual stress of less than about 300 MPa, and less than about 100 MPa.

20 Claims, 3 Drawing Sheets

(51) Int. Cl.
    *C04B 35/645*     (2006.01)
    *C04B 41/00*     (2006.01)
    *C04B 41/50*     (2006.01)
    *C04B 41/87*     (2006.01)

(52) U.S. Cl.
    CPC ........ *C04B 41/009* (2013.01); *C04B 41/5057* (2013.01); *C04B 41/87* (2013.01); *E21B 10/567* (2013.01); *C04B 2235/427* (2013.01); *C04B 2235/442* (2013.01)

(58) Field of Classification Search
    CPC ............ C04B 2235/442; C04B 35/528; C04B 35/645
    See application file for complete search history.

(56) References Cited

U.S. PATENT DOCUMENTS

| | | |
|---|---|---|
| 2012/0103700 A1 | 5/2012 | Lin |
| 2014/0166371 A1 | 6/2014 | Whittaker |
| 2015/0060151 A1* | 3/2015 | Fang ................ E21B 10/46 175/428 |
| 2016/0168919 A1 | 6/2016 | Zhao |

FOREIGN PATENT DOCUMENTS

| | | |
|---|---|---|
| WO | 2015122653 A1 | 8/2015 |
| WO | 2017106374 A1 | 6/2017 |

OTHER PUBLICATIONS

International Search Report and Written Opinion issued in International Patent application PCT/US2019/047447 dated Dec. 5, 2019, 11 pages.

Second Office Action and Search Report issued in China Patent Application No. 2019800578633 dated Oct. 11, 2023, 14 pages.

* cited by examiner

FIG. 6

CUTTING ELEMENTS WITH MODIFIED DIAMOND SURFACE

CROSS REFERENCE TO RELATED APPLICATION

This application claims priority to and the benefit of U.S. Provisional Application No. 62/722,209, filed Aug. 24, 2018, the entirety of which is incorporated here by reference.

BACKGROUND

Cutting elements, such as those used with bits for drilling earth formations, known in the art include a diamond surface layer, diamond table, or diamond body that is disposed onto a carbide substrate. The diamond table is used to provide properties of improved wear and abrasion resistance, relative to the underlying substrate, and the substrate is used to provide an attachment structure to facilitate attachment of the cutting element to an end-use machine tool, e.g., such as a drill bit or the like.

The diamond table of such known cutting elements is formed from polycrystalline diamond (PCD) and includes cobalt, where the cobalt is used as the solvent metal catalyst to facilitate diamond bonding during a high-pressure/high-temperature (HPHT) sintering process used to form the PCD. The cobalt in the PCD is known to have a coefficient of thermal expansion that is much different from the diamond with the PCD, thereby producing unwanted thermal stresses within the diamond table during use of the cutting element. While the diamond layer operates to provide improved wear and abrasion resistance to the cutter, e.g., when compared to cutting elements having a wear surface formed from tungsten carbide, the diamond layer is known to have a coefficient of thermal expansion that is much different than that of the underlying substrate which is typically formed from tungsten carbide. Accordingly, for such conventional cutters, the HPHT process used to sinter the diamond and form the PCD layer, and bond the PCD layer to the underlying tungsten carbide substrate is one that is known to produce a cutting element having a high degree of residual compressive stress of around 600 MPa or greater. The presence of such residual compressive stress induced on the diamond layer generally produces a counterbalancing amount of tension in the interface region that may often result in cutting element breakage or diamond layer delamination under drilling conditions.

Attempts to improve the service life of such cutting elements have focused on reducing the residual tensile stress at the diamond layer-substrate interface, thereby reducing or minimizing the event of breakage, fracture, or delamination under drilling conditions. While such efforts may be useful in reducing or minimizing instances of breakage or delamination, such performance gains are provided at the expense of compromising the wear resistance and resistance to crack initiation at the surface of the diamond table, which also operates to limit the effective service life of the cutting element.

SUMMARY

Cutting elements as disclosed herein include a diamond-bonded body that is sintered under HPHT conditions in the presence of a carbonate material, where the body includes a matrix phase of intercrystalline bonded diamond with interstitial regions including the carbonate material, where the diamond-bonded body is sintered without a substrate. A matrix casting is mechanically coupled to the body, where the matrix casting is formed and coupled to the body after the body is formed, and where a portion of the body surface is exposed along a surface of the matrix casting that includes a working surface of the cutting element. The body has a compressive residual stress along the exposed surface of the body that is greater than the residual stress of at least a region of a remaining portion of the body, where the compressive residual surface stress is created after formation of the cutting element. In an example, the compressive residual surface stress is less than about 500 MPa, and from about 100 to 500 MPa. A remaining region the body may have a residual stress of less than about 300 MPa, and less than about 100 MPa. In an example, the carbonate material is selected from magnesium carbonate, calcium carbonate, or combinations thereof, and the matrix casting may include tungsten carbide.

Cutting elements as disclosed herein may be made by subjecting a volume of diamond grains to an HPHT sintering condition in the presence of a carbonate material and in the absence of a substrate to form a carbonate polycrystalline diamond body including a matrix phase of intercrystalline bonded diamond and a plurality of interstitial regions dispersed within the matrix phase including the carbonate material. Thereafter carbonate polycrystalline diamond body may be combined with matrix casting precursor materials and the combination may be subjected to an elevated temperature to form a matrix casting that is mechanically coupled to the carbonate polycrystalline body, where a surface portion of the carbonate polycrystalline diamond body is exposed from the matrix casting. The exposed region of the carbonate polycrystalline diamond body is then treated to increase the compressive residual stress of the surface portion as noted above. In an example, the treatment may include subjecting the exposed surface portion to collisions with particles. In an example, the particles may have a hardness of from about 100 to 4,000 $kg/mm^2$ or in some embodiments from about 1,000 to 4,000 $kg/mm^2$.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

These and other features and advantages of cutting elements as disclosed herein will be appreciated as the same becomes better understood by reference to the following detailed description when considered in connection with the accompanying drawings where.

DETAILED DESCRIPTION

Cutting elements as disclosed herein include a diamond-bonded body that is formed under HPHT conditions using a carbonate solvent catalyst material in the absence of a substrate, and is hereafter referred to as carbonate PCD. The carbonate PCD body may be combined with an unconventional substrate during a subsequent process, e.g., a casting process, for the purpose of forming a cutting element and adapting the PCD body for attachment with a desired device or member for performing a desired end-use application. A substrate made by the casting process differs from conventional substrates in that there is no chemical bond formed between the PCD and the cast matrix material, and, e.g., there may only be a frictional bond between these that is formed by mechanical interlocking of the materials during the casting process. Cutting elements as disclosed herein display a low level of residual stress both within the carbonate PCD body itself, microstress, and within the cutting element as a whole, macrostress, thereby providing an increased level of fracture resistance when compared to conventional PCD cutting elements (formed using a cobalt catalyst and joined with a metallic substrate during the HPHT process used to make the PCD body). Cutting elements as disclosed herein are treated to have increased compressive residual stress on a surface of the carbonate PCD table or body to thereby provide increased levels of wear resistance and impact resistance (that meets or exceeds that of conventional PCD cutting elements), thereby providing properties of increased fracture resistance, wear and impact resistance that increases the operational service life of such cutting elements.

Figure 1:
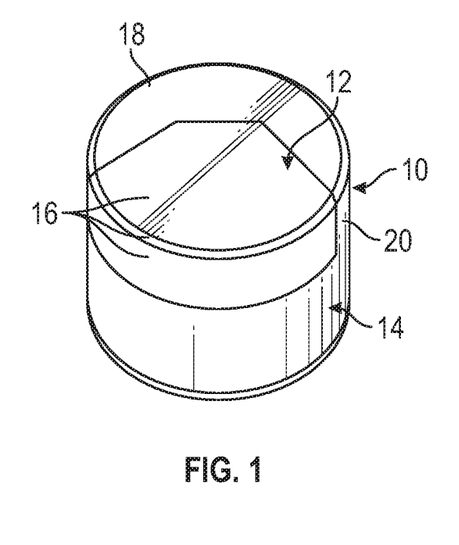
FIG. 1 illustrates a perspective view of an example cutting element as disclosed herein.

FIG. 1 illustrates an example embodiment cutting element 10 as disclosed herein including a diamond table or diamond body 12 that is coupled to a substrate 14. In an example embodiment the diamond body 12 may be in the form of a cylindrical disk or the like, but may be in any other form useful for the particular end-use application. A feature of cutting elements as disclosed herein is that at least a portion of the diamond table 12 is exposed from the substrate 14, such portion including one or more working surfaces 16 for making contact against a surface of another object when placed into use. The portion of the diamond table surface forming the working surfaces 16 may be a flat, curved or an edge surface depending on the particular end-use application.

In an example embodiment, such as that illustrated in FIG. 1, the diamond body 12 occupies a partial surface area of a total top surface area 18 of the cutting element, where the remaining top surface area is occupied by the substrate. In an example, the diamond body may be 10 to 90 percent, 20 to 80 percent, and 30 to 70 percent of the total top surface area of the cutting element 10. The diamond body, in this particular embodiment, occupies a partial side surface area of a total side surface area 20 of the cutting element, where the remaining side surface area is occupied by the substrate. In an example, the diamond body may be 1 to 50 percent, 2 to 30 percent, and 5 to 20 percent of the total side surface area of the cutting element 10. It is to be understood that cutting element as disclosed above and illustrated in FIG. 1 is but one example of a number of different cutting element configurations intended to be within the scope of this disclosure. For example, while a cutting element has been illustrated having a flat surface, cutting elements having curved or other non-planar shaped surfaces are intended to be within the scope of this disclosure, where such cutting element may include the diamond table configured in a manner useful for providing an exposed surface including a working surface (to facilitate the desired use of such other configured cutting element).

A feature of cutting elements as disclosed herein is that a portion of the diamond body is covered by the substrate so as to mechanically couple or lock the diamond body with the substrate. Thus, with reference to the example cutting element illustrated in FIG. 1, a portion of the diamond body is not visible and extends beneath the surface of the substrate for the purpose of mechanically locking the diamond body and substrate together.

Figure 2:
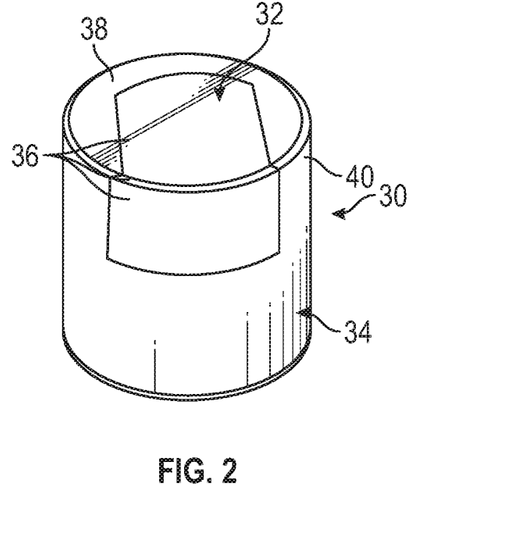
FIG. 2 illustrates a perspective view of another example cutting element as disclosed herein.

FIG. 2 illustrates an example cutting element 30 that is similar to that of FIG. 1, including a diamond body 32 coupled to a substrate 34, where a portion of the diamond body is exposed from the substrate to provide one or more working surfaces 36, and where the exposed portion of the diamond body occupies a partial region of the cutting element total top surface 38, and occupies a partial region of the cutting element total side surface 40, along with a beveled region in between. In this embodiment, the exposed region of the diamond body 32 along the top surface 38 is shaped differently than that illustrated in FIG. 1, e.g., the shape of such exposed region remains constant moving radially outwardly from a cutter central axis to the side surface. Like the embodiment of FIG. 1, the diamond body 30 is configured having a region disposed within the substrate for purposes of mechanically coupling or locking the diamond body and substrate together.

Figure 3:
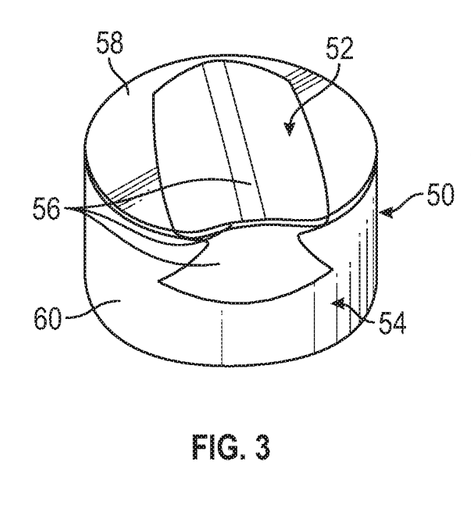
FIG. 3 illustrates a perspective view of another example cutting element as disclosed herein.

FIG. 3 illustrates another example cutting element 50 including a diamond body 52 coupled to a substrate 54, where a portion of the diamond body is exposed from the substrate to provide one or more working surfaces 56, and where the exposed portion of the diamond body occupies a partial region of the cutting element total top surface 58, and occupies a partial region of the cutting element total side surface 56. Unlike the examples illustrated in FIGS. 1 and 2, the exposed portion of the diamond body 52 of this embodiment has an apex configuration along the top surface 58. Such apex surface may operate as a working surface alone and/or with an exposed side portion of the exposed diamond body along the cutting element side surface 60. A feature of such embodiment is the shape of the diamond body, having such an apex configuration with unexposed regions disposed into the substrate below the substrate top surface to mechanically lock the diamond body within the substrate. Such locking relationship, provided between the interfaces of the diamond body and surrounding regions of the substrate, is shown along the side surface of the cutting element.

Figure 4:
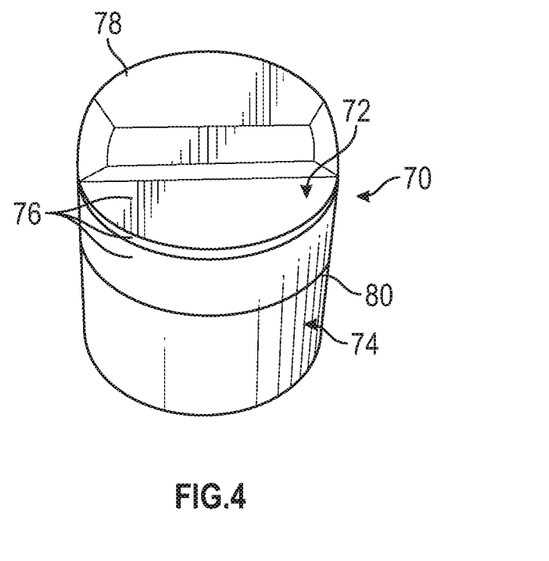
FIG. 4 illustrates a perspective view of another example cutting element as disclosed herein.

FIG. 4 illustrates another example cutting element 70 including a diamond body 72 coupled to a substrate 74, where a portion of the diamond body is exposed from the substrate to provide one or more working surfaces 76, and where the exposed portion of the diamond body occupies a partial region of the cutting element total top surface 78, and occupies a partial region of the cutting element total side surface 80. Unlike the examples illustrated in FIGS. 1 to 3, the substrate includes a region that extends along the top surface of the cutting element extending on top of a portion of the diamond body so that only a portion of the diamond body along the top surface is exposed. Additionally, the diamond body (when taken along cross-sectional side view) has wedge shape (taken between upper and lower surfaces of the diamond body) that increases in thickness moving radially from the cutting element side surface towards a center axis of the cutting element and towards the portion of the substrate disposed over the top of the diamond body. Together, the portion of the substrate disposed over the top of the diamond body and the diamond body wedge side profile operate to mechanically lock the diamond body into place within the substrate.

In an example embodiment the diamond body 12 may be in the form of a cylindrical disk or the like, but may be in any other form useful for the particular end-use application. A feature of cutting elements as disclosed herein is that at least a portion of the diamond table is exposed from the substrate, such portion including one or more working surfaces for making contact against a surface of another object when placed into use. The portion of the diamond table surface forming one or more working surfaces may be a flat, and/or curved, and/or have an edge configuration depending on the particular end-use application.

In an example, the diamond table of cutting elements as disclosed herein is formed by combining a volume of diamond grains and subjecting them to a sintering HPHT process in the presence of a carbonate catalyst. In an example embodiment, the carbonate catalyst may be selected from the group of carbonates including but not limited the alkaline-earth family of carbonates such as magnesium carbonate, calcium carbonate, combinations of the same, and the like. In an example, the diamond table may have a diamond volume content of from about 80 to 99, from about 88 to 98, and from about 90 to 96 percent based on the total volume of the materials used to form the diamond table. In an example, the diamond table may have a catalyst volume content of from about 1 to 20, from about 2 to 12, and from about 4 to 10 percent based on the total volume of the materials used to form the diamond table. In an example, the diamond table has a diamond volume content of above about 92 percent by volume, and a catalyst content of less than about 8 percent by volume.

In an example embodiment, the diamond table is formed by placing the volume of the diamond grains or powder along with a volume of the carbonate catalyst within a metal enclosure or assembly of a reaction cell of a HPHT apparatus. The reaction cell is then placed under HPHT processing conditions sufficient to cause the intercrystalline bonding between the diamond grains or particles. The reaction cell is then placed under HPHT processing conditions sufficient to cause sintering of diamond particles. In an example embodiment, the cutting elements as disclosed herein are formed by subjecting the assembly to a HPHT process condition where the pressure is between about 5,500 to 7,000 MPa and the temperature is between about 1,300 to 2,000° C. for a period of time sufficient to ensure formation of the fully-sintered carbonate polycrystalline diamond (PCD) table or body. In some instances it is desired that cutting elements as disclosed herein be sintered at HPHT process conditions including ultra-high pressure conditions of greater than about 7,000 MPa, and in the range of from about 7,000 to 15,000 MPa, with processing temperatures in the range 1,500 to 2,500° C.

The resulting diamond table is carbonate PCD including a matrix phase of intercrystalline bonded diamond and a plurality of interstitial phases or regions dispersed in the matrix phase and including the carbonate catalyst. After sintering, the carbonate material may be heat treated to transform at least part of the material from carbonate to oxide by heat to a sufficient temperature that the carbon dioxide is produced. The carbonate catalyst material may be magnesium carbonate. A feature of such magnesium carbonate catalyst material is that it has a low tensile stress and has coefficient of thermal expansion that is close to that of diamond, e.g., that is much closer than the conventional cobalt catalyst, thereby producing a diamond table having a very low amount of residual stress, i.e., microstress, as compared to conventional PCD including a cobalt catalyst. Also, in an example embodiment, the diamond table is sintered and formed without a substrate, thereby avoiding an unwanted introduction of residual stress, i.e., macrostress, due to the differences in the coefficient of thermal expansion between the diamond body and a substrate that is typically formed from tungsten carbide.

Thus, diamond tables formed from carbonate PCD in the manner disclosed herein have greatly reduced residual microstress and residual macrostress, as compared to conventional PCD diamond tables formed using a cobalt catalyst and that are bonded to a tungsten carbide substrate during the sintering HPHT process. In an example, such conventional PCD may have a level of residual stress within the diamond body, i.e., microstress due to differences between diamond and cobalt coefficients of thermal expansion, of greater than about 100 MPa, from about 100 MPa to about 500 MPa, and from about 200 MPa to 400 MPa. It is understood that the exact level of microstress within the diamond body of such conventional PCD can and will vary depending on such factors as the volume content of the diamond and/or cobalt as well as the sintering HPHT condition.

In an example, a conventional cutting element including conventional PCD joined to a substrate during the diamond HPHT sintering process may have a level of compressive residual stress within the cutting element, i.e., macrostress due to differences between the PCD diamond body and substrate coefficients of thermal expansion, of greater than about 500 MPa, and from about 600 MPa to about 800 MPa or 1,000 MPa. While this range of compressive stress in the PCD is by itself desirable, the counterbalancing tension in the interface and substrate regions makes a conventional cutter subject to delamination and therefore is undesirable. It is understood that the exact level of such macrostress within the diamond body of conventional PCD can and will vary depending on such factors as the volume content of the diamond and/or cobalt, the particular tungsten carbide volume content in the substrate, as well as the sintering HPHT conditions. It is to be understood that the microstress and macrostress levels provided are those of a respective conventional PCD diamond body and cutting element including the same without finishing processing. Subjecting such conventional PCD cutting elements to conventional finish processing, such as OD grinding and the like, may operate to introduce a third component of residual stress to the PCD cutting element (in addition to microstress and macrostress) that may exist at the surface of the cutting element subjected to such finishing processing. The surface of such conventional PCD cutting elements subjecting to such conventional finish processing may have a stress that is greater than the macrostress levels noted above by about 50 MPa to 100 MPa, depending on the particular type of finish processing.

Cutting elements including the carbonate PCD bodies made in the manner disclosed herein have a level of residual stress, i.e., microstress, within the carbonate PCD body of less than about 100 MPa, from about 0 to 100 MPa, from about 0 to 50 MPa, from about 0 to 25 MPa, and from about 0 to 10 MPa. In some cases, the microstress can measure slightly tensile. Again, the low level of microstress in the carbonate PCD body can be explained by the low elastic modulus and tensile strength of the magnesium carbonate and the relative closeness between the coefficients of thermal expansion of diamond and the magnesium carbonate catalyst material.

Referring to FIG. 1, in an example embodiment, the diamond body 12 is coupled to a substrate 14 to thereby form the cutting element 10. If desired, the diamond body may be treated to remove all or part of the catalyst material therefrom, e.g., all or part of the diamond body may be subjected to a leaching process. The substrate 14 may be formed from a metallic material, a ceramic material, or a cermet material. In an example embodiment, the matrix casting is formed from a cermet material and is coupled to the carbonate PCD body separate and apart from the HPHT process used to sinter the body. In an example, the substrate is formed during a casting process whereby the diamond body is combined with a precursor material used to form the substrate, which precursor material may include matrix materials, such as tungsten and carbide, and a binder material for joining the matrix materials together, such as cobalt. In some embodiments, the resulting construction formed by the casting process is referred to as a matrix casting, and operates to form a mechanical attachment or mechanically couple with the diamond body and for this reason is different from and not considered a substrate associated with conventional PCD cutting elements (i.e., formed using cobalt where the substrate is tungsten carbide joined to the PCD body during the HPHT sintering process).

In an example embodiment, the precursor material use to form the matrix casting includes a matrix powder (e.g., tungsten carbide (WC) powder or tungsten (W) powder) and a binder material. In one embodiment, the binder material may be any suitable metal, such as, for instance, iron, cobalt, nickel, copper, manganese, zinc, tin, alloys thereof (e.g., nickel alloy), or any suitable combination thereof. The metal binder material may be provided either as a separate powder or as a solid body (e.g., a disc of binder material) placed on top of the matrix powder. In another embodiment, the metal binder powder may be intermixed with the matrix powder. Additionally, in one or more embodiments, the method may include a task of mixing an organic solvent (e.g., alcohol) with the metal binder powder and the matrix powder to form a slurry or a paste. Mixing the organic solvent into the matrix powder and the binder powder may facilitate ease of handling the precursor material during the task of combining the precursor material with the carbonate PCD body. The organic solvent may be selected such that is does not affect the chemical characteristics of the matrix material. In addition, fluxing agents may be used to promote wetting and/or protect the components from oxidation. Any of these materials may be provided in powder form, liquid form, green-state form, and combinations thereof or the like.

In an example, the matrix casting precursor material is combined with the carbonate PCD body in a container or mold, and the body is positioned within the mold such that at least a portion of the carbonate PCD body surface remains exposed from the precursor material once the matrix casting is formed (or may be exposed by minimal finishing), where such exposed carbonate PCD body surface includes a working surface of the cutting element. In an example, such desired placement arrangement of the carbonate PCD body relative to the matrix casting precursor materials may be provided by the configuration of the body and/or may be provided through a feature of the mold and/or may be provided by a displacement member configured to provide the desired placement position of the body relative to the matrix casting precursor materials within the mold, and/or also provide the desired exposed body surface area from the matrix casting after the casting process.

In an example, the matrix casting precursor material is provided in the form of tungsten powder, carbide powder, and cobalt powder, and the carbonate diamond is positioned within the container or mold relative to the precursor material to produce the desired cutting element working surface. The container or mold is sealed and subjected to an elevated temperature for a period of time sufficient to cause the cobalt to melt and to infiltrate through the mixture of tungsten and carbide. Once a desired degree of binder infiltration through the mixture of tungsten and carbide has occurred, the temperature of the mold is reduced below the infiltration temperature to cause the binder to solidify and thereby bind the matrix particles together to form a solid body matrix in the desired size and shape of the matrix casting. Additionally, during the process of cooling the mold, the solidified matrix casting is mechanically joined to the carbonate PCD body, i.e., the matrix casting encapsulates a sufficient portion of the carbonate PCD body to mechanically lock or interlock the body in place. To assist in forming this interlocking arrangement between the body and the matrix casting, the body may be configured in a manner facilitating the formation of such interlocking combination. In an example, matrix castings useful for making cutting elements as disclosed herein may be formed in the same manner as disclosed and illustrated in US Published Patent Application 2016/0168919, which is hereby incorporated in its entirety by reference.

Cutting elements as disclosed herein and formed according the methods disclosed herein operates to reduce the level of unwanted residual stress, i.e., microstress and macrostress, in the resulting cutting element. For example, carbonate PCD bodies as disclosed herein have a level residual stress, i.e., microstress, that is less than about 100 MPa, from about 0 to 100 MPa, from about 0 to 50 MPa, and from about 0 to 25 MPa as measured before being attached with the matrix casting. To characterize a sintered PCD body such that the measured residual stress state is free of surface effects such as grinding and lapping the residual stress measurement may be made on a fracture surface.

Cutting elements formed according to these principals, where the carbonate PCD body is coupled with a tungsten carbide matrix casting in the manner disclosed, display a level of residual stress, i.e., combined microstress and macrostress, that is less than about 300 MPa, from about 0 to 300 MPa, from about 0 to 200 MPa, from about 0 to 100 MPa, less than 50 MPa, from about 0 to 50 MPa, and from about 0 to 25 MPa. Thus, a feature of such cutting elements as compared with conventional PCD cutting elements (formed using a cobalt catalyst and joined to a tungsten carbide substrate during HPHT sintering, is the greatly reduced levels of residual stresses, both microstresses and macrostress, that exist as a result of both the construction materials and methods of making. Specifically, the carbonate PCD body as disclosed herein may have zero residual stress, i.e., microstress, which is not the case with conventional PCD that displays a level of residual stress that is at least 100 MPa and higher up to 400 MPa or more. Further, when provided in the form of a cutting element including the matrix casting, the cutting elements as disclosed herein display significantly reduced levels of residual stress, i.e., macrostress, that are hundreds of MPas less than, and may even be an order of magnitude less than, the macrostress of conventional PCD cutting elements. Engineering the carbonate PCD body and cutting element including the same with the matrix casting in the manner disclosed produces a PCD body and cutting element having significantly reduced tensile residual stresses to thereby provide an improved degree of cracking and delamination resistance not otherwise present in conventional PCD cutting elements.

A feature of cutting elements as disclosed herein is that they are specially treated to induce or impose a desired level of compressive residual stress on an exposed surface portion of the carbonate PCD body, i.e., a portion of the exposed surface including a working surface. Cutting elements made in the manner disclosed above without such treatment include a carbonate PCD body having a relatively low level of compressive residual stress for the reasons described above. For example, before treatment, an exposed surface of the carbonate PCD body of the cutting element exhibits the compressive residual stress levels noted above, i.e., combined microstress and macrostress, of less than about 300 MPa, from about 0 to 300 MPa, from about 0 to 200 MPa, from about 0 to 100 MPa, less than 50 MPa, from about 0 to 50 MPa, and from about 0 to 25 MPa. In fact, without treatment, the residual compressive stress that exists at the exposed surface of the carbonate PCD body is approximately the same as remaining regions of the body extending a depth away from the exposed surface.

By contrast, conventional cutting elements (including a conventional PCD body formed from cobalt and attached to a tungsten carbide substrate during the HPHT process of sintering the PCD body) are known to display a relatively higher level of compressive residual stress at the surface than at other regions due to finishing processes as discussed above. Accordingly, conventional PCD cutters may have a compressive residual stress at the surface of at least 600 MPa, and in the range of from about 600 to 1500 MPa. Further, the compressive residual stress within the PCD body of a conventional PCD cutting element may increase within the body with proximity to the substrate, e.g., at locations in the PCD body where residual stress is imposed by the substrate, thereby increasing the residual stress existing within the PCD body at such locations.

Cutting elements as disclosed herein are treated after being formed, i.e., after the matrix casting and carbonate PCD body are combined in the manner disclosed above, to intentionally increase the amount of compressive residual stress along an exposed surface portion of the carbonate PCD body. In an example embodiment, cutting elements as disclosed herein are treated to provide a compressive residual stress along the exposed surface of greater than about 100 MPa, greater than about 200 MPa, from about 100 to 1,000 MPa, from about 100 to 800 MPa, from about 100 to 500 MPa, from about 100 to 400 MPa, and less than about 500 MPa, depending on the particular treatment process and/or the particular end-use application. In some embodiments, cutting elements as disclosed here may be treated to provide a level of compressive residual stress along the surface that is up to about 700 MPa. The surface compressive stress is measured by using Raman spectroscopy as described in which is described below.

Figure 5:
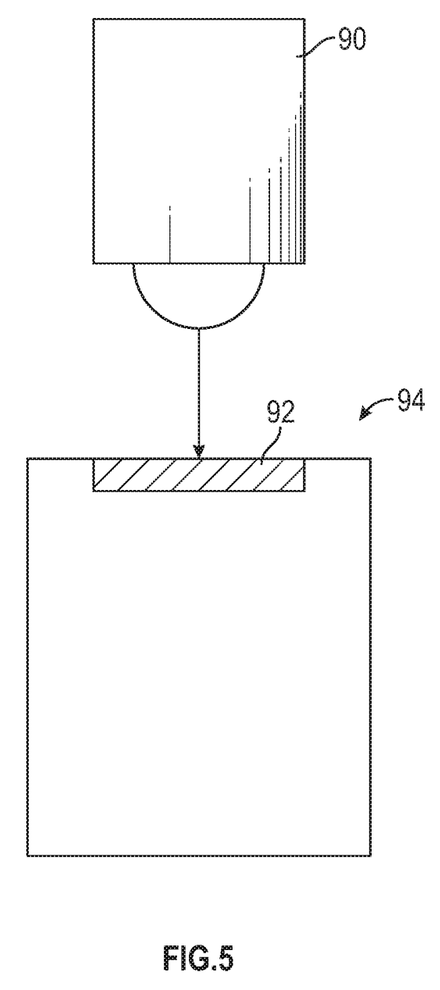
FIG. 5 illustrates a test configuration for conducting a compressive stress analysis of cutting elements as disclosed herein.

A schematic of a configuration useful for measuring such tests is shown in FIG. 5. Laser probe 90 is directed at the surface of the carbonate PCD diamond body 92 of cutting element 94. Diamond has a single Raman-active peak, which under stress free conditions is located at $\omega_0=1332.5$ cm$^{-1}$. For polycrystalline diamond, this peak is shifted with applied stress according to the relation:

$$\Delta\omega = \frac{\omega_0 \gamma}{B}\sigma_H$$

where $\Delta\omega$ is the shift in the Raman frequency, $\gamma$ is the Grunesian constant, equaling 1.06, B is the bulk modulus, equaling 442 GPa, and $\sigma_H$ is the hydrostatic stress. $\sigma_H$ is defined as:

$$\sigma_H = \frac{\sigma_1 + \sigma_2 + \sigma_3}{3}$$

where $\sigma_1$, $\sigma_2$, and $\sigma_3$ are the three orthogonal stresses in an arbitrary coordinate system, the sum of which equals the first stress invariant. In the center of the apex of an insert, it is reasonable to assume equibiaxial conditions ($\sigma_1=\sigma_2=\sigma_B$ and $\sigma_3=0$). In which case, the relation between the biaxial stress $\sigma_B$ and the peak shift is given by:

$$\Delta\omega = \frac{2\omega_0 \gamma}{3B}\sigma_B.$$

The cutting elements were characterized using Raman spectroscopy and fatigue contact testing. The equipment used to collect the Raman spectra employed a near-infrared laser operating at 785 nm, a fiber optic lens/collection system and a spectrometer incorporating a CCD-array camera. The peak centers were determined by fitting a Gaussian curve to the experimental data using intrinsic fitting software. The Gaussian expression is given by:

$$I(x) = I_0 \exp\left[\ln 0.5 \frac{(x-\omega_C)^2}{(w/2)^2}\right]$$

where $I(x)$ is the intensity as a function of position, $I_0$ is the maximum intensity, $\omega_C$ is the peak center, and w is the peak width, i.e., the full width at half maximum intensity. In this analysis, the fitted peak center was used to determine the compressive stress. While the above method of determining compressive stress has been disclosed in the context of measuring the compressive stress at a top surface, it is to be understood that the same method can be used to measure the stress along an outside diameter of the cutting element or at another other surface region of the cutting element.

The surface portion of the carbonate PCD body that is treated to induce such increased compressive residual stress may include all of the body surface exposed by the matrix casting or only a portion of the body surface exposed by the matrix casting, e.g., a portion forming one or more working surfaces. In an example, the treated portion includes a portion of the body surface exposed by the matrix casting that includes a working surface of the cutting element. In an example, the treated carbonate PCD body surface portion that exhibits the increased compressive residual stress may extend a depth from the surface into the carbonate PCD body a depth of greater than about 5 micrometers, greater than about 50 micrometers, from about 20 to 200 micrometers, from about 30 to 150 micrometers, from about 50 to 100 micrometers, depending on such factors as the size of the cutting element and total thickness of the carbonate PCD body, grain size of PCD, the particular treatment process used, and/or the particular end-use application. In an example embodiment, it is understood amount of the carbonate PCD body including the increased compressive residual stress resulting from the treatment is less than about 50 percent, less than about 30 percent, and less than about 20 percent of the total volume of the carbonate PCD body extending from the surface inwardly a depth into the carbonate PCD body (which included both exposed and non-exposed portions of the carbonate PCD body), depending on the particular treatment process and/or the particular end-use application.

It is understood that the remaining volume of the carbonate PCD body, i.e., the portion or region of the carbonate PCD body not displaying the increased compressive residual stress resulting from the treatment, has the same level of compressive residual stress noted above for the untreated carbonate PCD body. Thus, unlike conventional PCD cutting elements, cutting elements as disclosed herein after treatment include a carbonate PCD body having a desired increased level of compressive residual stress along the exposed surface, and a reduced level of compressive residual stress moving inwardly away from the surface and into remaining regions of the carbonate PCD body.

In an example, the treatment may include subjecting the cutting element exposed carbonate PCD body surface to multiple impact forces. The basic technique for inducing the desired increased surface compressive residual stress involves multiple collisions between the carbonate PCD body surface and another hard material. This may be accomplished by high-velocity impacts by hard particles, media or members against the carbonate PCD surface by methods such as grit blasting, high energy tumbling, vibrafinishing, shot peening and the like. In the case of hard particle impacts, the hardness of the particles can be in the range of about 100 to 4,000 kg/mm$^2$ or in some embodiments, from 1,000 to 4,000 kg/mm$^2$. Suitable particles useful for producing the desired hard particle impacts include ceramic carbides, nitrides, oxides, and borides—such as silicon carbide, tungsten carbide, boron carbide, silicon nitride, zirconium oxide, aluminum oxide, and titanium diboride. Under controlled conditions, harder impact media may be employed up to and including diamond particulates.

In an example, in a grit blasting process, the use of silicon carbide grit has been shown to induce higher levels of compressive residual stress than with aluminum oxide, and tungsten carbide has also shown useful for this purpose. In an example, such hard particles may be directed at the carbonate PCD surface by air pressure, e.g., of from about 50 to 100 psi through a suitably sized nozzle, e.g., having a nozzle diameter of about 1.0 mm to 10 mm, for a blasting time of from about 5 to 200 seconds to provide the desired amount of surface compressive residual stress disclosed herein. Blasting-induced surface compressive residual stresses can also be relieved by processes such as heat treatment. Therefore, the cutting elements may be treated to induce the surface compressive residual stress after any bonding, heat treating, joining, or other processes that involve significant heating of the cutting elements as disclosed herein.

It is to be understood that the above-disclosed treatment techniques can be used alone or in various combinations with one another to produce cutting elements including a carbonate PCD body having the desired level surface compressive residual stress.

Cutting elements as disclosed herein, display an improved degree of wear resistance and impact resistance when compared to conventional PCD cutting elements (formed using a cobalt catalyst and attached during the HPHT sintering process to a tungsten carbide substrate), that is a result of the low amount of residual stress, both microstress and macrostress. For example, with reference to impact testing done by the process of repeated impacts into hardened steel anvils at 50 J energy levels on the OD surfaces, cutting elements as disclosed herein (embodied as a 13 millimeter shear cutting element) and treated in the manner disclosed to induce the desired degree of surface compressive residual stress displayed a degree of impact resistance (measured as average hits to failure) that was greater than that of the same-sized conventional PCD cutting element, while having a level of compressive surface stress that was much less than the conventional PCD cutting element.

In some embodiments, cutting elements as disclosed herein, are specifically engineered to both display a low degree of residual compressive stress, microstress and macrostress due to use of the carbonate catalyst and casting method of forming and combining the matrix casting with the carbonate PCD body, in contrast with the high degree of residual tensile stresses present near the interface in conventional PCD cutting elements and known to cause delamination and microstructural failure events, while also providing an increased level of compressive residual stress at the surface of the carbonate PCD body, where it may be needed most to provide a desired amount of impact resistance and wear resistance that is comparable to or greater than that associated with conventional PCD cutting elements.

Cutting elements as disclosed herein may be used in a number of different applications, such as tools for mining, cutting, machining, milling and construction applications, where properties of wear resistance, abrasion resistance, toughness, and mechanical strength, and/or reduced thermal residual stress, e.g., caused by mismatched coefficients of thermal expansion, are highly desired. Cutting elements as disclosed herein are particularly well suited for use in machine tools and drill and mining bits such as roller cone rock bits, percussion or hammer bits, drag bits, fixed blade bits, and the like used in subterranean drilling applications. Accordingly, it is to be understood that the cutting elements as disclosed herein may be used in any of the above-noted types of drill and mining bits depending on the particular end-use application.

Figure 6:
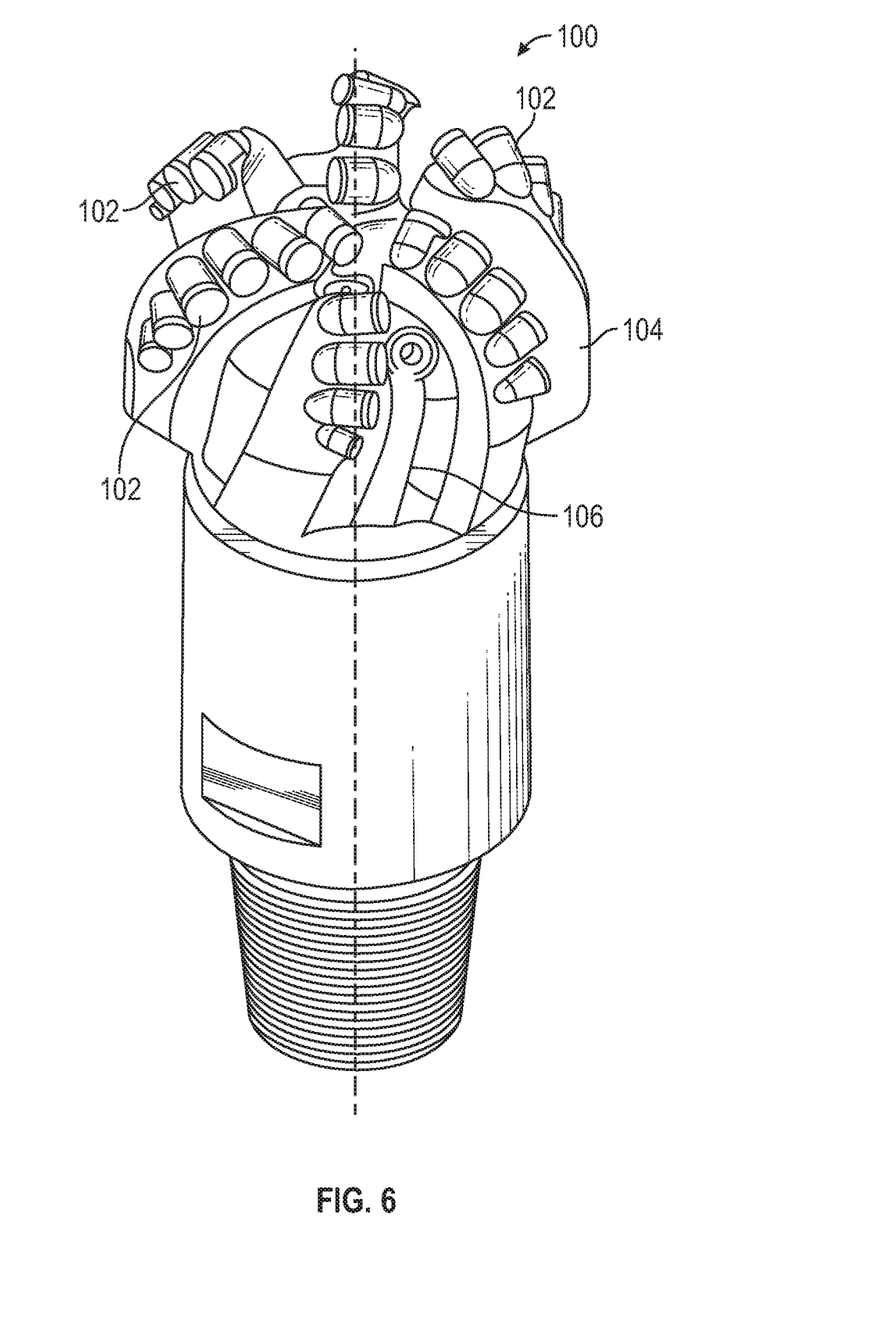
FIG. 6 is a perspective view of a drag drill bit including a number of example cutting elements as disclosed herein.

FIG. 6 illustrates a drag bit 100 for drilling subterranean formations including a plurality of the cutting elements 102 as disclosed herein that are each attached to blades 104 that extend from a head 106 of the drag bit for cutting against a subterranean formation being drilled.

Although but a few example embodiments have been described in detail above, those skilled in the art will readily appreciate that many modifications are possible in the example embodiments without materially departing from this invention. For example, cutting elements as disclosed herein include a carbonate PCD body having a uniform PCD microstructure extending through the body that is provided in the form of a single layer. It is to be understood that carbonate PCD bodies as disclosed herein may include more than one layer of carbonate PCD, depending on the particular end-use application and resulting properties called for. Also, it is possible that cutting elements as disclosed herein may include a layer of material that is not carbonate PCD interposed between the carbonate PCD body and the matrix casting, e.g., in the event that such other layer of material may operate to further operate to reduce residual stress within the cutting element. These are but a few examples of modifications of cutting elements as disclosed herein that are intended to be within the scope of the disclosure.

Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke "means plus function" for any features of any of the claims herein, except for those in which the claim expressly uses the words 'means for' together with an associated function.

What is claimed is:

1. A cutting element comprising:
a diamond-bonded body that is sintered under HPHT conditions in the presence of a carbonate material, wherein the body comprises a matrix phase of intercrystalline bonded diamond with interstitial regions comprising the carbonate material, wherein the diamond bonded body is sintered without a substrate; and
a matrix casting that is mechanically coupled to the body, wherein the matrix casting is formed and coupled to the body after the body is formed, and wherein a portion of the body surface is exposed along a surface of the matrix casting that comprises a working surface of the cutting element, and wherein a portion of the body is covered by the matrix casting;
wherein the body has a compressive residual stress along the exposed surface of the body that is greater than the residual stress of the covered portion of the body, the covered portion of the body comprising a residual stress of less than 100 MPa, wherein the compressive residual surface stress is induced after formation of the cutting element, and
wherein the exposed surface of the body is 10 to 90 percent of the total top surface area of the cutting element and about 1 to 50 percent of a total side surface area of the cutting element.

2. The cutting element as recited in claim 1, wherein the body compressive residual surface stress is less than about 700 MPa.

3. The cutting element as recited in claim 1, wherein the body compressive residual surface stress is about 500 MPa or less.

4. The cutting element as recited in claim 3, wherein the body compressive residual surface stress is greater than about 100 MPa.

5. The cutting element as recited in claim 1, wherein the diamond-bonded body is a carbonate PCD body, and wherein before inducing the compressive residual surface stress, the body has a compressive residual stress of less than about 300 MPa.

6. The cutting element as recited in claim 1, wherein the exposed surface of the body is located along a top surface of the cutting element and occupies a partial surface area of the total surface area of the top surface.

7. The cutting element as recited in claim 6, wherein the exposed surface occupies about 30 to about 80 percent of the total top surface area of the cutting element, and wherein the matrix casting occupies a remaining surface area of the top surface.

8. The cutting element as recited in claim 6, wherein the exposed surface of the body occupies a side surface of the cutting element extending from and adjacent to the top surface, and wherein the exposed surface occupies about 1 to 30 percent of the total side surface area of the cutting element, and wherein the matrix casting occupies a remaining surface area of the side surface.

9. The cutting element as recited in claim 1, wherein the matrix casting comprises tungsten carbide, and the carbonate material is selected from the group consisting of magnesium carbonate, calcium carbonate, and combinations thereof.

10. A method for making a cutting element comprising the steps of:
subjecting a volume of diamond grains to an HPHT sintering condition in the presence of a carbonate material and in the absence of a substrate to form a carbonate polycrystalline diamond body comprising a matrix phase of intercrystalline bonded diamond and a plurality of interstitial regions dispersed within the matrix phase comprising the carbonate material;
combining the carbonate polycrystalline diamond body with matrix casting precursor materials and subjecting the combination to an elevated temperature to form a matrix casting that is mechanically coupled to the carbonate polycrystalline body, wherein a surface portion of the carbonate polycrystalline diamond body is exposed from the matrix casting; and
treating the exposed surface portion of the carbonate polycrystalline diamond body to increase the compressive residual stress of the surface portion;
wherein the exposed surface portion comprises a compressive residual stress that is greater than the residual stress of at least a region of a remaining portion of the carbonate polycrystalline diamond body, and wherein the at least a region of the remaining portion of the carbonate polycrystalline diamond body that is not exposed has a compressive residual stress of less than about 100 MPa.

11. The method as recited in claim 10, wherein before treating, the surface portion of the carbonate polycrystalline diamond body has a compressive residual stress of less than about 300 MPa.

12. The method as recited in claim 10, wherein treating increases the compressive residual stress of the surface portion by about 5 to 100 times a compressive residual stress of the exposed surface before treating.

13. The method as recited in claim 10, wherein after treating, the compressive residual stress of the surface portion is from about 100 to 500 MPa.

14. The method as recited in claim 13, wherein after treating, a region of the carbonate polycrystalline diamond body that is not the exposed surface has a compressive residual stress of less than about 100 MPa.

15. The method as recited in claim 10, wherein the carbonate material is magnesium carbonate, and the precursor materials comprise matrix materials of tungsten and carbide, and a metallic binder.

16. The method as recited in claim 10, wherein treating comprises subjecting the exposed surface portion to collisions with particles.

17. The method as recited in claim 16, wherein the particles have a hardness of from about 1,000 to 4,000 kg/mm$^2$.

18. The method as recited in claim 10, wherein after combining and forming the matrix casting, the exposed surface of the carbonate polycrystalline diamond body occupies a partial portion of a top surface of the cutting element, and the matrix casting occupies a remaining portion of the top surface.

19. The method as recited in claim 18, wherein the exposed surface of the carbonate polycrystalline diamond body extends from the partial portion of the top surface to a partial portion of an adjacent side surface of the cutting element.

20. A cutting element comprising:
 a diamond-bonded body that is sintered under HPHT conditions in the presence of a carbonate material, wherein the body comprises a matrix phase of inter-crystalline bonded diamond with interstitial regions comprising the carbonate material, wherein the diamond bonded body is sintered without a substrate; and
 a matrix casting that is mechanically coupled to the body, wherein the matrix casting is formed and coupled to the body after the body is formed, and wherein a portion of the body surface is exposed along a surface of the matrix casting that comprises a working surface of the cutting element, and wherein a portion of the body is covered by the matrix casting;
 wherein the exposed surface of the body has a residual stress of greater than about 100 MPa and the covered portion of the body comprising a residual stress of less than 100 MPa, and wherein the compressive residual surface stress is induced after formation of the cutting element,
 wherein the exposed surface of the body is 10 to 90 percent of the total top surface area of the cutting element and about 1 to 50 percent of a total side surface area of the cutting element.

* * * * *